United States Patent
Seidl et al.

(10) Patent No.: US 7,984,058 B2
(45) Date of Patent: Jul. 19, 2011

(54) DATABASE QUERY CONSTRUCTION AND HANDLING

(75) Inventors: Robert Seidl, Portola Valley, CA (US); Frank Flynn, Palo Alto, CA (US); Michael DeLorenzo, SF, CA (US)

(73) Assignee: Genius.com Incorporated, San Mateo, CA (US)

( * ) Notice: Subject to any disclaimer, the term of this patent is extended or adjusted under 35 U.S.C. 154(b) by 230 days.

(21) Appl. No.: 11/417,948

(22) Filed: May 3, 2006

(65) Prior Publication Data

US 2006/0277157 A1 Dec. 7, 2006

Related U.S. Application Data

(60) Provisional application No. 60/687,597, filed on Jun. 2, 2005.

(51) Int. Cl.
*G06F 17/30* (2006.01)
(52) U.S. Cl. ........................................................ 707/759
(58) Field of Classification Search ........................ None
See application file for complete search history.

(56) References Cited

U.S. PATENT DOCUMENTS

| | | | |
|---|---|---|---|
| 5,550,971 A * | 8/1996 | Brunner et al. ................... 707/3 |
| 5,708,780 A | 1/1998 | Levergood et al. |
| 5,721,901 A | 2/1998 | Banning et al. |
| 5,920,856 A * | 7/1999 | Syeda-Mahmood ............. 707/3 |
| 5,935,207 A | 8/1999 | Logue et al. |
| 6,029,141 A | 2/2000 | Bezos et al. |
| 6,052,730 A | 4/2000 | Felciano et al. |
| 6,345,292 B1 | 2/2002 | Daugherty et al. |
| 6,598,051 B1 | 7/2003 | Wiener et al. |
| 7,043,555 B1 | 5/2006 | McClain et al. |
| 7,054,858 B2 * | 5/2006 | Sutherland ........................ 707/4 |
| 7,072,947 B1 | 7/2006 | Knox et al. |
| 7,076,533 B1 | 7/2006 | Knox et al. |
| 7,120,590 B1 | 10/2006 | Eisen et al. |
| 7,127,608 B2 | 10/2006 | Royer et al. |
| 7,236,972 B2 * | 6/2007 | Lewak et al. ..................... 707/4 |
| 2002/0010757 A1 | 1/2002 | Grank et al. |
| 2002/0128908 A1 | 9/2002 | Levin et al. |
| 2003/0014403 A1 * | 1/2003 | Chandrasekar et al. .......... 707/5 |
| 2003/0225834 A1 | 12/2003 | Lee et al. |
| 2004/0117486 A1 | 6/2004 | Bourne et al. |

(Continued)

FOREIGN PATENT DOCUMENTS

EP    0926614    6/1999

(Continued)

OTHER PUBLICATIONS

International Search Report mailed Oct. 25, 2006 for International Application No. PCT/US2006/020604, 4 pages.

(Continued)

*Primary Examiner* — Charles Rones
*Assistant Examiner* — Yuk Ting Choi
(74) *Attorney, Agent, or Firm* — Blakely, Sokoloff, Taylor & Zafman LLP

(57) ABSTRACT

A method and apparatus is disclosed herein for constructing a complex database query. In one embodiment, the method comprises receiving a selection of meta data indicative of searchable data values stored in two or more database tables. The method also includes constructing a complex database query to search the two or more database tables based on the received selection of meta data.

37 Claims, 10 Drawing Sheets

U.S. PATENT DOCUMENTS

| | | | |
|---|---|---|---|
| 2005/0010557 A1 | 1/2005 | Dettinger et al. | |
| 2005/0038900 A1* | 2/2005 | Krassner et al. | 709/231 |
| 2005/0044101 A1 | 2/2005 | Prasad et al. | |
| 2005/0102271 A1* | 5/2005 | Robertson | 707/2 |
| 2005/0119913 A1 | 6/2005 | Hornreich et al. | |
| 2005/0222981 A1* | 10/2005 | Lawrence et al. | 707/3 |
| 2005/0256908 A1* | 11/2005 | Yang et al. | 707/200 |
| 2006/0020580 A1* | 1/2006 | Dettinger et al. | 707/3 |
| 2006/0041550 A1 | 2/2006 | Bennett et al. | |
| 2006/0059238 A1 | 3/2006 | Slater et al. | |
| 2006/0212362 A1 | 9/2006 | Donsbach et al. | |

FOREIGN PATENT DOCUMENTS

| | | |
|---|---|---|
| WO | WO 00/41118 | 7/2000 |
| WO | WO 01/41002 A | 6/2001 |
| WO | WO 2005/006216 A | 1/2005 |

OTHER PUBLICATIONS

Baeza-Yates, R, et al, "Relating web characteristics with link based web page ranking," String Processing and Information Retrieval, 2001. SPIRE 2001. Proceedings Eighth International Symposium, Nov. 13-15, 2001, pp. 21-32.

PCT Preliminary Report on Patentability, PCT/US2006/020603 issued Dec. 6, 2007 (2 pages).

PCT Written Opinion of the International Searching Authority, PCT/US2006/020603 issued Dec. 6, 2007 (6 pages).

International Search Report and Written Opinion of the International Searching Authority, European Patent Office, Application No. PCT/US2006/020603 mailed Nov. 20, 2006.

Office Action dated Sep. 10, 2008, U.S. Appl. No. 11/417,949, filed May 3, 2006.

Final Office Action dated Feb. 3, 2009, U.S. Appl. No. 11/417,949, filed May 3, 2006.

Office Action dated Jun. 8, 2009, U.S. Appl. No. 11/417,949, filed May 3, 2006.

Final Office Action dated Oct. 28, 2009, U.S. Appl. No. 11/418,416, filed May 3, 2006.

Office Action dated Feb. 18, 2010, U.S. Appl. No. 11/418,416, filed May 3, 2006.

Office Action dated Feb. 18, 2010, U.S. Appl. No. 11/418,416, filed Jul. 20, 2010.

* cited by examiner

DATABASE QUERY CONSTRUCTION AND HANDLING

PRIORITY

The present patent application claims the benefit of U.S. provisional patent application No. 60/687,597 filed on Jun. 2, 2005, titled, "Automatic Meta-Data Driven Construction of Generated Complex SQL Queries with a Simple User Interface" and hereby incorporates it by reference.

RELATED APPLICATIONS

This application is related to the co-pending application entitled Deep Clickflow Tracking, concurrently filed on May 3, 2006, U.S. patent application Ser. No. 11/417,949, and Realtime Database Architecture, concurrently filed on May 3, 2006 U.S. patent application Ser. No. 11/418,416.

FIELD OF THE INVENTION

The present invention relates to the field of marketing information support systems; more particularly, the present invention relates to metadata driven construction of complex database queries.

BACKGROUND OF THE INVENTION

The internet continues to expand as a source of information gathering and information distribution. Businesses increasingly market, sell, support, and offer information about products to potential customers via the internet. To provide marketing support to businesses, approaches have been developed which provide information about how business' web sites are used. Data corresponding to web site use is then stored in a database, so that the data can later be analyzed. Such systems gather a tremendous amount of information and presenting all of the information, even in aggregated form, can easily overwhelm users. Furthermore, details, trends, and patters can be lost when presenting all of the collected information, further obscuring relevant marketing information.

Relevancy, especially in marketing, sales, or support environments changes frequently. The changes are sometimes influenced on a per-person, per quarter, per product, etc. basis. For example, a sales person might deem certain contracts between clients and the sales person as relevant when during that quarter, the sales person's client visited a web site 3 or more times during the quarter, remained on the website for at least 5 minutes, and had downloaded sales material.

One prior approach providing end-user access to data stored in a database is to allow an end-user to define a simple query on a single database table within a database. For example, suppose that a sales person has access to a database where one of the tables is a contacts table. In order to determine, for example, database entries from a contacts table with a last name that starts with "Fr" the Structured Query Language (SQL) query would take the form of:

SELECT * FROM contacts WHERE Last_Name="Fr"

The query illustrates that the only names available correspond directly with the field "Last_Name" in the database table "Contacts" for the object type in question (contacts in the example above). In other words each field name has a direct correspondent in the database table. However, in a system with a multitude of tables, some populated by end users but many generated from data collected by backend processors, email subsystems, interfaces to ad placement, bid management, tracking systems, etc., the types of query necessary to generate end user relevant data are much more complex.

SUMMARY OF THE INVENTION

A system and method is disclosed herein for constructing a complex database query. In one embodiment, the method comprises receiving a selection of meta data indicative of searchable data values stored in two or more database tables. The method also includes constructing a complex database query to search the two or more database tables based on the received selection of meta data.

Other features and advantages of the present invention will be apparent from the accompanying drawings and from the detailed description that follows below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
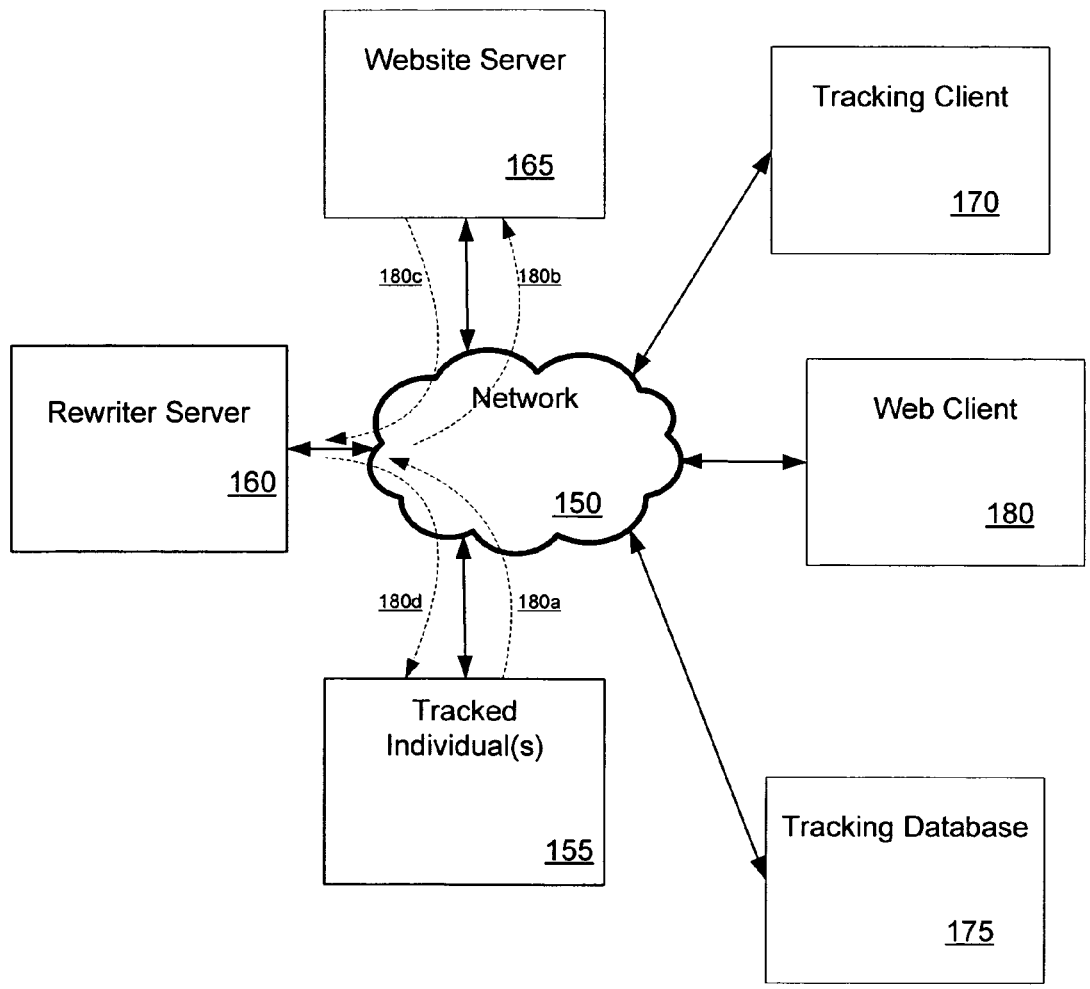
FIG. 1A is a network overview of one embodiment of a network that may be used to implement complex metadata driven database query construction.

An apparatus for constructing a complex database query. In one embodiment, the method comprises receiving a selection of meta data indicative of searchable data values stored in two or more database tables. The method also includes constructing a complex database query to search the two or more database tables based on the received selection of meta data.

In one embodiment, the method further includes evaluating the complex database query to search the two or more database tables. Then, based on the results of the evaluation, the method includes receiving resultant meta information, in response to evaluating the complex database query, corresponding to the constructed complex database query. The received resultant meta data is utilized to dynamically generate a graphical user interface based on the resultant meta information. Beneficially meta data drives both the complex database query's construction as well as a dynamically created user interface. Furthermore, because meta data is utilized by the method, instead of hard-coded programming, new tables, objects, operators, etc. may easily be added to expand database search options, data types, user interface options, etc.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1A is a network diagram of one embodiment of a network that may be used to implement a meta-data driven complex database query construction and handling system, as discussed below. For one embodiment, network 150 is the internet. In another embodiment, network 150 is a wireless application protocol (WAP) network. Other networks, such as local area network (LANs), wide area networks (WANs), digital subscriber lines (DSL), etc. may be utilized. Furthermore, in one embodiment, network 150 is a mix of wired and/or wireless networks.

Tracked Individual(s) 155 may run a web browser program to interact with a web page requested from website server 165. In one embodiment, tracked individual wishes to interact with web pages from website server 165. Tracked individual(s) 155 are provided with modified links that resolve at rewriter server 160, but resemble links to website server 165. In response to a request, rewriter server 160 supplies web pages from website server 165 with modified links to tracked individual(s) 155.

Clickflow tracking data is generated when rewriter server 160 receives a request 180$a$ for web content, such as a web page, served by website server 165. Clickflow tracking data is data indicative of tracked individual(s) 155 interactions with a web page, which includes link selection, sequence of web pages visited on a web site, time on a web page, referrer, host address, time on a web site, email received, email bounced, email read, etc. In one embodiment, request 180$a$ is received by rewriter server 160 when tracked individual(s) 155 selects a modified link which is modified to resemble a link to website server 165, but which resolves at rewriter server 160.

In one embodiment, upon receiving the request for web content, corresponding to the link selection, rewriter server 160 stores data indicative of the link selection in tracking database 175. In addition to link selection, rewriter server 160 may store additional items of clickflow data such as timestamps, time on page, identity of the requestor, time on site, etc. In one embodiment, rewriter server 160 stores the data in tracking database 175 through network 150. In another embodiment, tracking database 175 may be directly connected to rewriter server 160.

Rewriter server 160 then requests a web page 180$b$, corresponding to link selection 180$a$, from website server 165. Rewriter server then receives the requested web page 180$c$ from website server 165. In one embodiment, rewriter server 160 rewrites uniform resource locator (URL) links, as well as other links, to again resolve at rewriter server 160. Rewriter server 160 then supplies 180$d$ the web site with the modified links to tracked individual(s) 155. Therefore, for subsequent requests for web content received from client user 155, control again returns to rewriter server 160 in order to store clickflow data in tracking database 175 and supply modified web pages to tracked individual(s) 155. As such, a detailed record of tracked individual(s) 155 interactions with web content served from website server 165 is recorded.

In one embodiment, tracking client 170 is an application run on a computing system utilized to monitor and receive updates to tracking database 175. In one embodiment, tracking client 170 displays updated information received from a tracking server (not shown) on a graphical user interface as tracked individual(s) 155 interacts with web content as being tracked. Furthermore, because comprehensive clickflow tracking data is stored in tracking database 175, tracking client 170 has access to the most current clickflow tracking data, as well as past clickflow tracking data.

In one embodiment, web client 180 receives requests to query tracking database 175. In one embodiment, web client 180 displays of a user interface for receiving a selection of meta-data which will be utilized by web client 180 to construct a complex database query. The complex meta-data driven database queries are referred to as complex database queries because the query is a database query consisting of one or more queries based on multiple conditions across multiple databases.

The user interface displayed by web client 180 is dynamically created to display meta-data representing field, operator, and value choices of all available searchable data, by web client 180, which are stored in tracking database 175. A field corresponds to a field within a database table stored in tracking database 175. An operator is a statement, or condition, which defines a mathematical, logical, and/or range operation to apply to a search. For example, a search based on values greater than 50 would involve a mathematical condition. A value corresponds to the data to be searched. Therefore, in one embodiment, web client 180 displays on a user interface all possible searches options which can be executed by web client 180 on tracking database 175.

In one embodiment, after web client 180 receives a selection of metadata representing a database query, and constructs a complex query based on the metadata, web client 180 evaluates the query on the data stored in tracking database 175. Web client 180 then receives the results of the executed query and displays the results on the user interface of web client 180. Furthermore, in one embodiment, web client 180 writes the complex metadata driven query to a tracking server (not shown) of the tracking client 170. As a result, the tracking server may also periodically execute the complex metadata driven query against updated clickflow tracking data stored in tracking database 175. The tracking server, therefore, in response to evaluating the complex database queries, is able to provide realtime updates to a user interface of the tracking client 170 or generate notifications which are sent to tracking client 170 or some other source, such as a cellular phone.

Figure 1B:
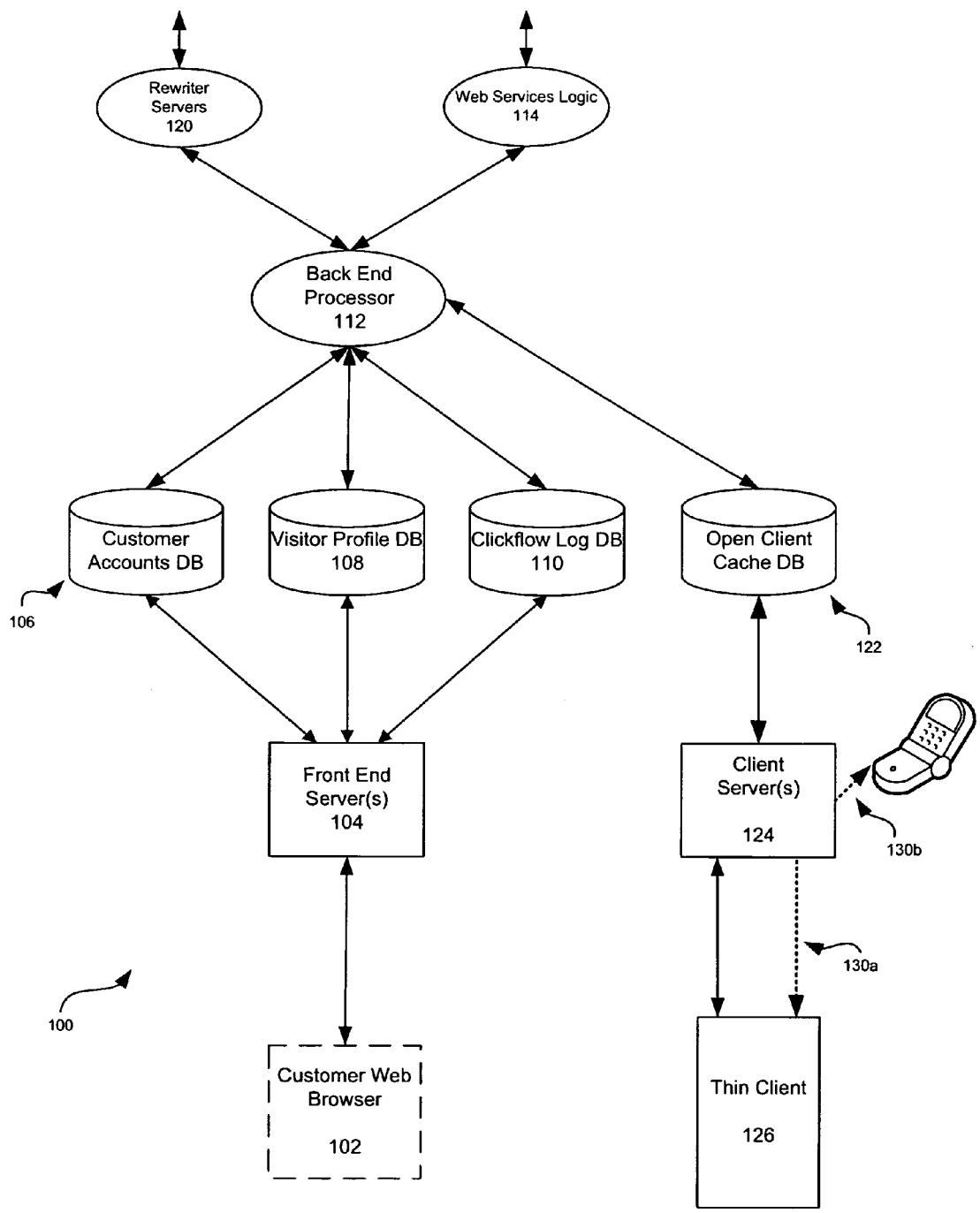
FIG. 1B is a block diagram providing an overview of a system for implementing complex metadata driven database queries.

FIG. 1B is a block diagram providing an overview of a system for implementing complex meta-data driven database queries. In one embodiment, front end server(s) 104 receive URLs from customer web browser 102, though other resource identifiers and locators may be used. The URLs provide addresses for web content, where user interactions with the web content can be tracked. Front end server(s) 104 may be a single server or multiple servers. Further, front end server(s) 104 may be located directly in proximity to or remote from databases 106-108.

Customer web browser 102 is displayed in dashed lines to indicate that it is not part of the realtime database architecture, but communicates with the architecture. In one embodiment, customer web browser is a web client 180, as discussed above. In one embodiment, front end server(s) 104 communicate with customer web browser 102 using standard Hyper Text Transfer Protocol (HTTP) protocols. However, any form of communication could be utilized to receive a URL, or an indication of the URL, to be tracked.

Upon receiving a request from customer web browser 102, front end server(s) 104 obtain customer account information which is stored in customer account database 106. In one embodiment, customer account database 106 stores, among other items, customer URLs, customer contact information, customer names, customer addresses, modified URLs, a unique customer identification number, referred to as a customer ID, etc. Customer accounts database 106 can be configured to store any information relevant to the customer.

In one embodiment, based on the received customer account information, a customer-specific user interface for complex database query construction, modification, and/or deletion is dynamically generated by Hypertext Pre-processor (PHP) scripting language embedded in a web page displayed by customer web browser 102. PHP is a scripting language that performs operations, according to the script, and outputs Hypertext Markup Language (HTML) which can be displayed by a web browser, such as customer web browser 102. As discussed below, the PHP script obtains meta data necessary to dynamically generate an HTML user interface for complex database query construction based on, for example, received customer identification data, such as the customer ID of a customer using customer web browser 102.

Because the PHP script obtains and utilizes meta information to generate the HTML user interface and generate a complex database query, query options may easily be added to one or more of databases 106-110 and 122. As discussed in greater detail below, upon a data table being added and/or updated in a database, corresponding meta-data is added to data structures utilized in the generation of the HTML user interface and complex query construction. As a result, the database records, the complex query options, and the HTML user interface are easily expandable without requiring complex hardcoded software updates.

In one embodiment, after the user interface is constructed, customer web browser 102 receives an indication to store, modify, or delete a complex metadata driven database query. In order to store or modify a complex database query, the PHP script within customer web browser 102 receives a selection of metadata corresponding to field, operator, and value metadata upon which a complex metadata driven database query will be constructed. This received meta information is then utilized by the PHP script to construct and store the effected complex database query.

Back end processor 112 modifies URLs and stores the modified URLs in one or more of databases 106-110. The modified URLs are later utilized to facilitate storing clickflow data indicative of interactions with a website in relevant sections of the clickflow log database 110, visitor profile database 108, and/or customer accounts database 106. In one embodiment, the modified URL is referred to as a GURLs, and it is addressed to a server that is able to provide deep clickflow tracking services of customers interactions with a website. The modified URL, or GURL, is modified to resemble a URL for a web page in this web site, but to resolve at a location (e.g., another server) through which the interactions of a user can be tracked. The web page includes links that are modified as well. In one embodiment, these modified links resolve at an address of rewriter servers 120. When a link is selected, the modified link, as well as other data is further modified, so that tracking information can be stored in one or all of databases 106-108.

In one embodiment, a web page with modified links is transmitted by front end server(s) 104 to a tracked individual. In one embodiment, the web page is transmitted using standard HTTP protocols so that it can be received in any HTTP compliant web browser.

Rewriter servers 120 receive data indicative of the tracked individual's selection of a modified link. In one embodiment, the link may include a key into the relevant portions of databases 106-110 used by the back end processor 112 to store link selection. In another embodiment, back end processor 112 performs a look-up to correlate a link with a person being tracked before link selection is stored in one or more of databases 106-110. The clickflow relevant data may include, for example, presence on a website, duration of a user on a website, sequence of pages visited within a website, time on page, referred, etc. Rewriter servers 120 then request the web page associated with the selected modified link and subsequently modifies links within the web page before supplying the user with the web page. As such, rewriter servers 120 supply the tracked individual with the requested web page, including modified links, so that rewriter server 120 can continue to track the individual's interactions with the web site.

Web services may also be supplied by web services logic 114 in connection with deep clickflow tracking information gathered by rewriting servers 120. In one embodiment, web services logic 114 supports customer advertising web services or to provide a customer with new or additional advertising web services. In one embodiment, the advertising web services supplied by web services logic 114 include, for example, cost-per-click (CPC) processing associated with advertisements, monitoring keywords and/or search terms associated with an advertisement, impression recordation, etc.

In one embodiment, web services logic 114 supplies customer/tracked individual interaction tools. The tools include, for example, "personal notes" left on a web page by a customer and/or tracked individual for the customer and/or tracked individual, text invitations, audio invitations, video invitations, chat invitations, personalized content based on the source of a tracked individual (e.g., customized to tracked individuals who are tracked after selecting a Google advertisements verses Yahoo advertisements), keyword matching, search term matching, etc. In one embodiment, web services logic 114 further supplies programmatically triggered interaction tools based on clickflow data. For example, web services logic 114 can send tracked individuals a "10% discount coupon" to specific tracked individuals tracked from Google searches, tracked individuals that have been to the customer website more than 3 times, other conditions indicating high interest, etc.

In one embodiment, web services logic 114 provides customer resource management (CRM) web services. The CRM web services would users and customers. The CRM web services could monitor and/or provide customers with contact information for users, sales information, monetary amounts, etc. Further, in one embodiment, the CRM services provided by web services logic 114 support ongoing business activities.

In one embodiment, web services logic 114 provides e-mail support services. Such e-mail support services include one or more of sending notifications whenever a modified link has been selected, user presence on a website is detected, a the results of a complex database query have been updated, or a programmatic condition stored as a complex database query has been satisfied, etc. Furthermore, the notifications may include audio or visual indications of the notification. In one embodiment, web services logic 114 sends out notifications when a programmed condition has been met. For example, web services 114 logic may be configured to send notifications to a client whenever a user selects a specific link, traverses a sequence of pages, etc.

In one embodiment, the e-mail support services supports update notifications in Short Message Service (SMS) form so that update notifications may be distributed over wireless networks. One skilled in the art will recognize the various channels of distributing update notifications.

Although specific examples have been discussed above with respect to web services logic, any number of services, notifications and associated conditions relevant to advertising, marketing, CRM services, email services, etc., can be provided by the web services logic 114 as will be apparent to those skilled in the art.

Thin client 126 operates on a computing system (not shown), for displaying data information such as updated content. In one embodiment, thin client 126 is a user interface implemented in standard Hyper Text Markup Language (HTML) to resemble an instant messenger client.

Thin client 126 receives updates to clickflow data automatically supplied by client server(s) 124. In one embodiment, thin client 126 also receives updated complex metadata driven database query evaluations. The updates might be one or more of updates to values which satisfying a complex database query, removing values which do not currently satisfy a complex database query, notifications that a programmatic condition as set in a complex database query has been satisfied, etc. The updates are received by the thin client 126 in pseudo real time while thin client 126 is open. In one embodiment, thin client 126 receives the updates in repeating increments of time, such as every 10 second, every 15 second, every 25 seconds, etc. In another embodiment, thin client 126 receives updates when a processing cycle of client server 126 for processing updates is completed, or the updates are supplied at intervals which are influenced by a current processing load of client server 126. Thus, a user using thing client 126 perceives receiving updated results for complex database queries in real time, when in fact the data is received in discrete increments of time. In one embodiment, data is communicated between client server(s) 124 and thin client 126 using standard HTTP communication protocols. In another embodiment, data is communicated between server(s) 124 and thin client 126 using proprietary communication protocols.

Client server(s) 124 may include or be integrated into servers 120, web services logic 114, or front end server(s) 104. Furthermore, in one embodiment, client server(s) 124 are distributed geographically to distribute processing loads handled by client server(s) 124 across a geographic area. Client server(s) 124 may further include identical and/or back up servers to supply updated data to thin clients 126 in case a client server either fails, or taken off-line for maintenance.

In one embodiment, client server(s) 124 determine when and what data is automatically supplied to thin client 126. Client server(s) 126, at some predetermined interval (e.g., every 10 seconds, every 15 seconds, every 25 seconds, etc.), check for updates to data items which are displayable by thin client 126. In one embodiment, the updates include complex meta-data driven database queries and/or programmatic conditions stored in one or more of open client cache DB 122 and databases 106-110. The complex database queries are stored in the one or more databases by web client 102 in response to web client 102 constructing a new complex meta-data driven database query and/or constructing a modified complex meta-data driven database query based on an existing complex meta-data driven database query. Furthermore, web client 102 upon receiving a selection to delete an existing complex meta-data driven database query, deletes the selected query from the one or more databases 106-110 and 122 so that the qeueries are no longer executed by front ender server(s) 104 and/or client server(s) 124.

When one or more updated data items are automatically supplied to thin client 126, client server(s) 124 further store a copy of the supplied data in a database, such as open client cache DB 122. Open client cache DB 122 further maintains an indication of whether a particular thin client 126 is online. When a thin client, such as thin client 126, is on-line, client server(s) 124 determine what data items, including data items corresponding to complex database query evaluations, are currently being displayed and what data items have previously been supplied to the thin client 126.

In one embodiment, as a result of the periodic open client cache DB updates, client server(s) 124 may send out notifications 130a to thin client 126 and/or 130b to other locations, such as a cell phone, voice mail, text message, SMS message, etc. regarding the a programmatic condition such as a conditions of a complex database query being satisfied and/or updated results for an existing complex database query. Any number of conditions could trigger a notification regarding the information available to a thin client. If thin client 126 is online, the notification 130a can be transmitted directly to the thin client and displayed on its user interface. If the thin client 126 is off-line, client server(s) 124 may send thin client 126 a notifications 130b using any alternative form of communication (e.g., an email, a page, a text message, a Short Message Service (SMS) message, etc.). Therefore, even when a user of thin client 126 is off-line, client server(s) 124 automatically provide updates as to relevant information and updates thereto.

As discussed herein, a complex metadata driven database queries, and programmatic conditions represented by the complex queries, are complex relationships and/or computed conditions that are defined and queried on two or more database tables stored in one or more databases. For example, assume that three tables, contacts, labels, and contac_has_label, are stored in a database, such as the databases illustrated in FIGS. 1A and 1B. Further, assume that each table includes various fields:

| | |
|---|---|
| contact | contactID, First, Last, Phone, Email, Company etc. |
| label | labelID, labelName |
| | user specified labels, eg Hot, A Lead, Journalist, Comdex Tradeshow etc. |
| contact_has_label | contactID, labelID |
| | 1-to-N table showing which contact has which labels |

A SQL query on the tables might be:
SELECT * FROM label WHERE labelName is/is not Hot/A Lead/Journalist The query, referred to herein as a condition, however, is not a simple SQL expression because the condition does not directly correspond to a single field in the "labels" database table. Furthermore, queries across multiple database tables in multiple databases cannot merely be combined by concatenating selected filed, operator, and values into an SQL query, because the search would expand beyond the bounds of a single table. As a result, prior simple user-defined query construction methods fail to allow automatic construction of complex SQL database queries.

Figure 2:
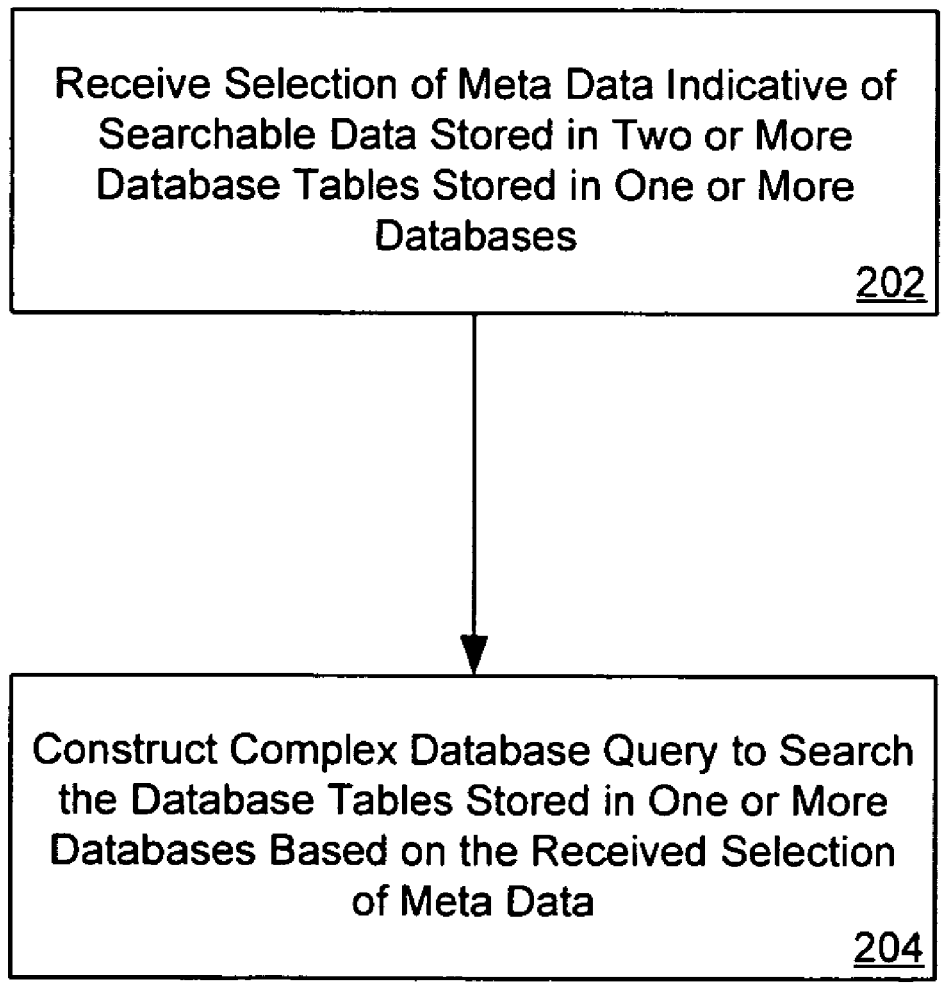
FIG. 2 illustrates a flow diagram of an overview of one embodiment of a process for constructing a complex metadata driven database query.

FIG. 2 illustrates a flow diagram of an overview of one embodiment of a process for constructing a complex metadata driven database query. The process is performed by processing logic that may comprise hardware (circuitry, dedicated logic, etc.), software (such as is run on a general purpose computer system or a dedicated machine), or a combination of both.

The process begins, in FIG. 2, with processing logic receiving a selection of metadata indicative of searchable data stored in two or more database tables stored in one or more databases (processing block 202). In one embodiment, the metadata is received by processing logic in response to user selection on a user interface that displays the meta data. Because metadata is data that describes data, selection of, for example, metadata Contacts represents a Contacts table stored in a database. A user making the selection of Contacts need not be aware of what database table Contacts is stored in, whether Contacts is the actual name of the table, etc. Instead, the use of metadata in presenting choices to a user simplifies providing relevant choices for query creation.

Next, processing logic constructs a complex database query to search the database tables stored in the one or more databases based on the received selection of metadata (processing block 204). In one embodiment, processing logic constructs a complex database query that conforms to the SQL query syntax of "SELECT * FROM table WHERE field (condition) value." The details of processing blocks 202 and 204 are discussed in greater detail below.

Figure 3:
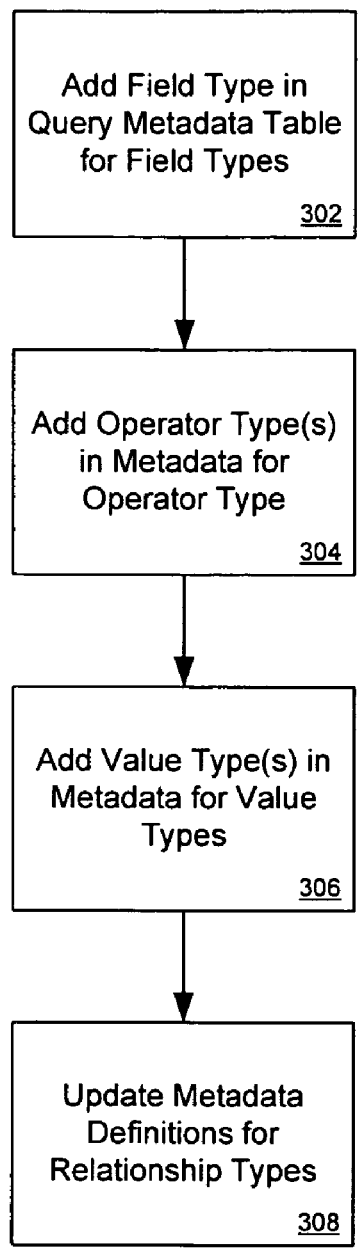
FIG. 3 illustrates a flow diagram of an over of one embodiment of a process for adding meta information to a query metadata table.

In order to construct a user interface to present a user with available fields, operators, and values, meta information corresponding to the query-able fields, operators, and values are added to a query metadata table. FIG. 3 illustrates a flow diagram of an overview of one embodiment of a process for adding meta information in a query metadata table. In one embodiment, the meta information corresponds to clickflow data stored in a database The process is performed by processing logic that may comprise hardware (circuitry, dedicated logic, etc.), software (such as is run on a general purpose computer system or a dedicated machine), or a combination of both. In one embodiment, the processing logic is part of a client server(s).

Referring to FIG. 3, the process begins with processing logic adding a field type in a query metadata table for field types (processing block 302). For example, in one embodiment, in order for processing logic to add "Label" to a query metadata table, processing logic utilizes the following SQL snippet:

```
SELECT contact.firstName, contact.lastName
FROM label, contact, contact_has_label
WHERE contact.contactID = contact_has_label.contactID
AND contact_has_label.labelID = label.labelID
AND label.labelName
```

As a result, "Label" is added to the query metadata table.

Next, processing logic adds operator type(s) to be associated with the field type added in processing block 302 (processing block 304). An operator may be any of a logic operator (e.g., AND operation, OR operation, etc.), an equality condition (e.g., equals "=", does not equal "!=", etc.), a range operator (e.g., greater than ">", less than "<", greater than equal to ">=", less than equal to "<="). Furthermore, in one embodiment, more complex operators are associated with field types including, for example, operators to determine whether a record contains a value, whether a record starts with a value, whether a record is or is not a member of a programmatic condition, etc. Query examples and associated example operator and value types are listed in Table 1, below. For example, processing logic, in an embodiment, adds metadata for operator types, "is" and "is not," to the query metadata table with SQL snippets:

```
= "__value__"       // Operator type "is"
!= "__value__"      // Operator type "is not"
```

Referring to FIG. 3, processing logic then adds value type(s) in query metadata for value types (processing block 306). In one embodiment, exemplary value types for "Label Values" is added with SQL snippet:

SELECT labelID, labelName FROM label

Processing logic then finishes the process of adding metadata in a query metadata table by updating query metadata information relationship types (processing block 308). In one embodiment, the updating includes defining relationships between the newly added field, operator, and value types to associate the three new types with each other. The relationship definitions may be stored within query metadata table, stored within a database, or memory utilized by processing logic. In one embodiment, relationship definitions are stored in databases, rather than being explicitly expressed as hard-coded PHP scripts and/or other programming language code. The relationship table itself is metadata/configuration data that both defines and maintains the existing data relationships. The dynamically created queries are metadata that are created by each customer with our user interface. PHP script routines and/or other programming language routines translate the relationship metadata (which operator types apply to which fields etc.) into JavaScript that executes on a user interface, such as a client, to generate the necessary popup menu fields in the visitor browser.

TABLE 1

| Field | Operator | Value |
|---|---|---|
| Contact Information Related | | |
| First Name | | |
| Last Name | | |
| Company | | |
| Email | | |
| Title | | |
| State | | |
| Zip | | |
| Address | | |
| Tag | | |
| Email Related | | |
| Email activity | was sent visited/"clicked GURL" didn't visit opted out opened bounced | <<list of email activities>> |
| Last email | sent bounced opted . . . | ever last week last 2weeks etc. |
| # emails sent | >, <, = | nr |
| Visit Related | | |
| # visits to website | >, <, = | nr |
| most recent visit | before, after, during | calendar interface |
| avg visit duration | >, <, = | nr |
| avg #pages/visit | >, <, = | nr |
| avg visits/month | >, <, = | nr |
| visited page URL | contains, starts w . . . | string |
| visited page Title | contains, starts w . . . | string |

TABLE 1-continued

| Field | Operator | Value |
|---|---|---|
| Google Related | | |
| Google ad clickthru | is | <<google activity>> |
| #Google ad clickthrus | >, <, = | nr |
| google search terms | contains, starts w . . . | string |
| Meta queries | | |
| contact | is member of not a member of Form Filling on Web Site | smartgroup X |
| Submitted form | containing | value (just match anything in query string) |
| Submitted form | called | <<list of all forms of customer X website>> eg Search, Sign up, Contact Me etc. |

Figure 4A:
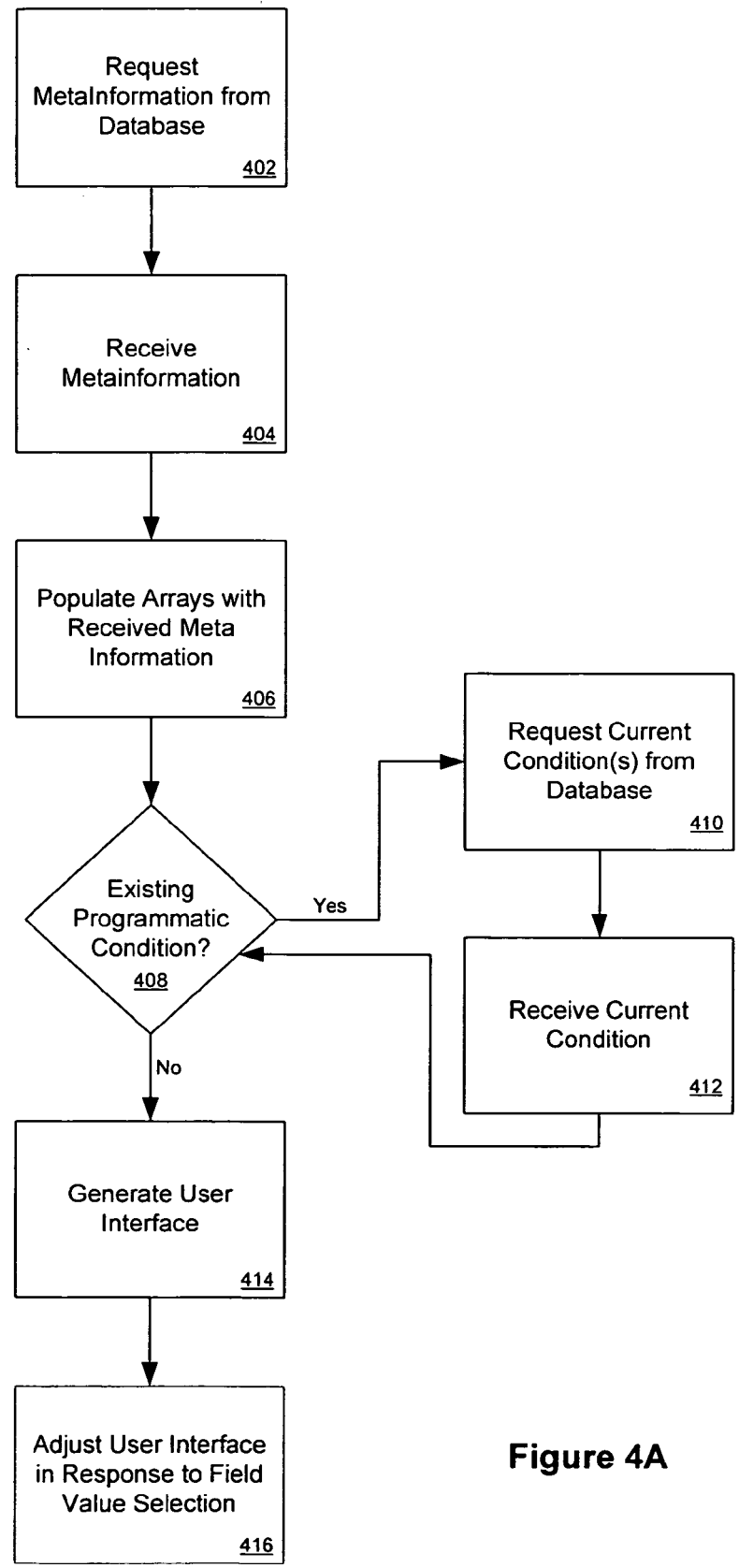
FIG. 4A illustrates a flow diagram of one embodiment of a process for constructing a complex metadata driven database query.

After meta information is added to a query metadata table stored in a database, processing logic utilizes the meta information in the database to construct a user interface. In one embodiment, the user interface receives a selection of metadata for use in constructing a complex metadata driven database query. FIG. 4A illustrates a flow diagram of one embodiment of a process for constructing a complex metadata driven database query. The process is performed by processing logic that may comprise hardware (circuitry, dedicated logic, etc.), software (such as is run on a general purpose computer system or a dedicated machine), or a combination of both. In one embodiment, the processing logic utilizes PHP scripts to dynamically generate HTML.

Referring to FIG. 4A, the process begins by processing logic requesting meta information, corresponding to searchable data, stored in a database (processing block 402). In one embodiment as discussed above, the meta information is information which describes clickflow tracking data stored in one or more databases. For example, meta information "Email Activity" may describe data including when email was sent, when a modified link within the email was selected, whether the email was opened, when the email was bounced, etc. Processing logic then receives the requested meta information (processing block 404). In one embodiment, the requested meta information is associated with an identification number, such as a customer ID, so that processing logic receives meta information for the identification number (e.g., customer data).

Processing logic then utilizes the received meta information to populate arrays with the received information (processing block 406). In one embodiment, JavaScript generates client-side meta information arrays that are utilized to generate user-selectable popup menus. As such, the popup menus present, all fields associated with the identification number.

Because meta information may include programmatic condition, representing a complex metadata driven database query, information in the field, processing logic determines whether a field includes an existing programmatic condition (processing block 408). If the field does include a programmatic condition, processing logic requests the current conditions from one or more databases for an existing programmatic condition (processing logic 410). In one embodiment, requesting the current condition includes executing a complex database query corresponding to the desired programmatic conditions. Processing logic then receives the current programmatic conditions (processing block 412). Processing blocks 408-412 are repeated as necessary to request and receive current programmatic conditions.

After processing logic has populated arrays with the received meta information and obtained all necessary current conditions, processing logic generates a user interface (processing block 414). In one embodiment, the meta information and populated arrays are utilized by a PHP script to generate HTML for the user interface. Thus, in the embodiment, the PHP script dynamically generates a user interface based on the received metadata representing all possible field values received from a database.

In response to receiving a field value selection, from among all the possible field values, processing logic adjusts user interface display fields in the user interface (processing block 418). In one embodiment, depending on the field value chosen, associated content corresponding to operator and/or value types may need to be adjusted to correspond with the selected field. Because the received meta information (processing block 404) includes the associations among query meta fields information table entries, e.g., fields, processing logic adjusts the user interface to reflect the proper contents for condition and value selection regions as defined in the received meta information.

Figure 4B:
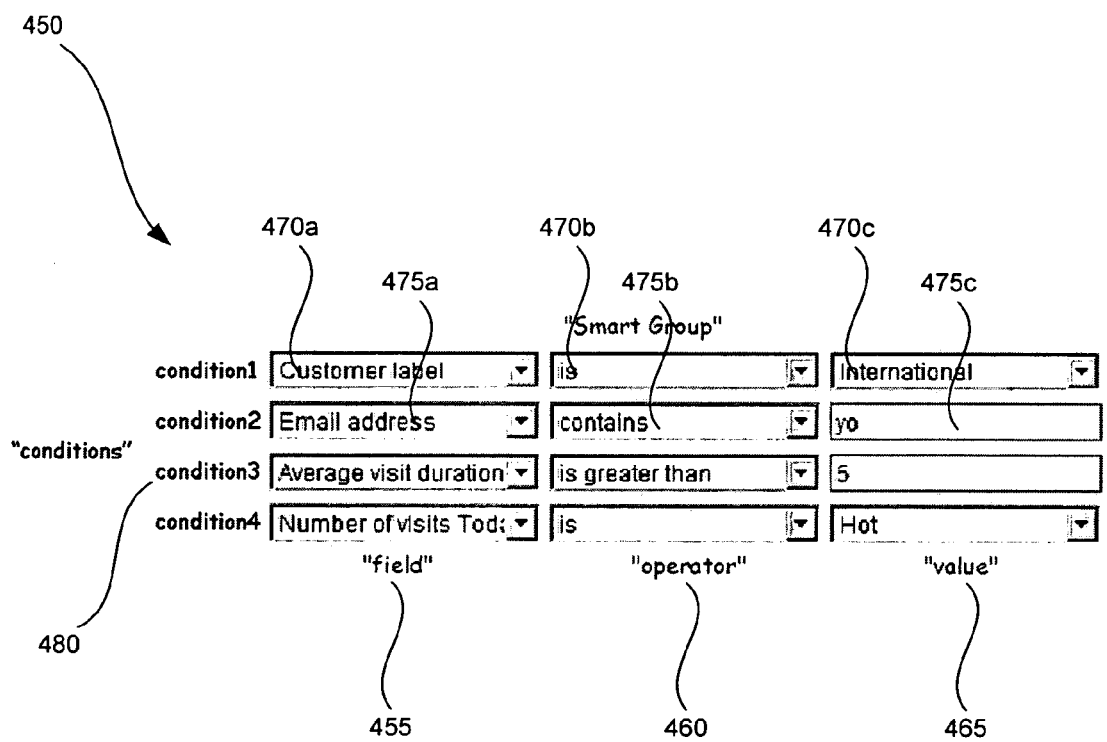
FIG. 4B illustrates one embodiment of a graphical user interface for interacting with complex database queries.

One embodiment of a user interface (UI) 450 for adding, deleting, edit, update, etc. complex database queries is illustrated in FIG. 4B. In one embodiment, processing logic utilizes software and/or hardware running on a web client to generate a UI. Furthermore, in one embodiment, the software is a PHP script for dynamically generating HTML documents.

The user interface may include one or more conditions 480 for a smart group. A condition refers to a selected database query, e.g., the specific query represented by a field 455, an operator 460, and a value 465 which are utilized to construct a complex database query, based on one or more conditions. For example, "condition3" 180 as illustrated, shows a condition which would generate a query where an average visit duration is greater than 5. In one embodiment, average visit duration is meta information describing clickflow relevant data corresponding to a tracked person's interactions with a web site. Furthermore, condition 1 through condition 4 may all be combined to create a complex multi-table multi-database database query.

As discussed with respect to FIG. 4A, processing logic may adjust a UI in response to receiving a user's field selection. As an example, for condition 1, when "customer label" 470a is selected, processing logic receives the selection. Because the field is defined as being associated with specific label and value types, an "is" operator 470b and "International" value 740c are displayed in the user interface. Furthermore, if the operator "contains" 475b is selected from the "Email address" 475a field menu, the user interface is adjusted to reflect that the selected field and operator 475a-b are associated with a user-inputted value type 475c for receiving a user's input. In one embodiment, individual conditions which form a complex programmatic condition may be programmatically added, removed, modified, etc.

In one embodiment, every possible popup control or text field (be it field, operator, or value field of the user interface) is coded as a "widget" in a widget table record with associated value types. Widgets that are popups further have enumerator values listed in a "controlElement" table with associated SQL snippets for each widget. Finally, a valid operator and value widgets for a given field enumerator are given in the "widgetcontrol" table. This structure facilitates expansion of the interface, as discussed above, as any number of widgets can be associated with one field enumerator. Furthermore, because each field, operator, and value is associated with meta information which defines relationships between the meta information and SQL snippets for creating complex database queries, selection of the complex database query contains all necessary information to construct a complex metadata driven database query.

Table 2 illustrates the above defined relationships, according to one embodiment:

TABLE 2

Widget Table Records (F = field metainfo, O = operator metainfo, V = value metainfo)

| | | |
|---|---|---|
| F | FieldToSearch First Name, Last Name, # Visits, Tag, etc. | |
| O | Numeric comparison operator | >, <, = |
| O | String comparison operator | starts with, ends with, contains, is, is not |
| O | Tag comparison operator | is, is not |
| V | Freeform text entry | |
| V | Numeric text entry | validate with javascript mgIsNumeric( ) etc. |
| V | Zipcode text entry | validate with javascript mgIsZipcode( ) etc. |
| V | Tag values | dynamically gen'd list of customers tags | controlElement Records Corresponding to Widgets

| displayValue* | displayOrder | widgetID** | SQLSnippet |
|---|---|---|---|
| First Name | 1 | FieldToSearch | contact.firstName |
| Last Name | 2 | FieldToSearch | contact.lastName |
| Tag | 4 | FieldToSearch | tag.customerID=__custID__ AND contact . . . |
| Zipcode | 5 | FieldToSearch | contact.zipCode |
| . . . | | | |
| > | 1 | Numeric cmp op | >__value__ |
| < | 2 | Numeric cmp op | <__value__ |
| = | 3 | Numeric cmp op | =__value__ |
| . . . | | | |
| is | 1 | String cmp op | = '__value__' |
| contains | 2 | String cmp op | LIKE '%__value__%' |
| starts with | 3 | String cmp op | LIKE '__value__%' |
| ends with | 4 | String cmp op | LIKE '%__value__' |
| etc. | | | |

*= Display value is actually an ID looked up through a UI Phrase table for easier localization,

TABLE 2-continued however the display value is presented as a text string to aid in the interpretation of the table.
**= widgetID is an ID, but the widget's name is used here for easier interpretation of the table.

widgetControls Records

| controlElementID | widgetID | position |
|---|---|---|
| fieldToSearch "Last Name" | fieldToSearch | 0 |
| fieldToSearch "Last Name" | String cmp op | 1 |
| fieldToSearch "Last Name" | Freeform text entry | 2 |
| fieldToSearch "Tag" | fieldToSearch | 0 |
| fieldToSearch "Tag" | Tag cmp op | 1 |
| fieldToSearch "Tag" | Tag values | 2 |
| fieldToSearch "Zipcode" | fieldToSearch | 0 |
| fieldToSearch "Zipcode" | String cmp op | 1 |
| fieldToSearch "Zipcode" | Zipcode text entry | 2 |

Figure 5:
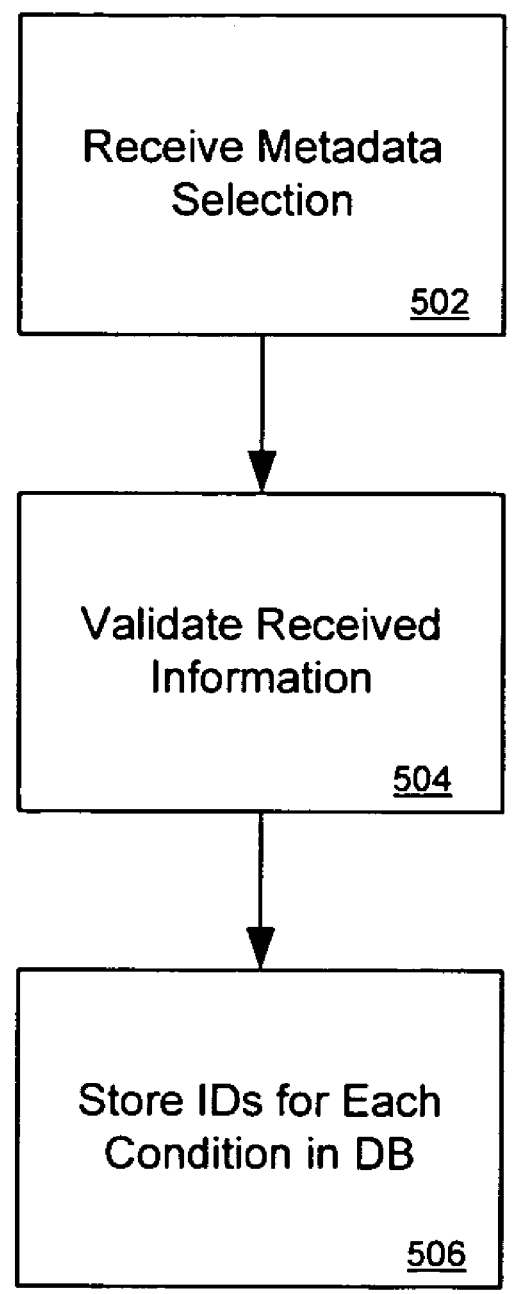
FIG. 5 illustrates a flow diagram of one embodiment of a process for validating received meta data for a complex metadata driven database query.

After conditions for a complex metadata driven database query have been selected, a user of the user interface may select to store and/or evaluate the complex database query. However, before the complex database query is stored and/or evaluated, as a programmatic condition, in one embodiment, the metadata received for the condition is validated to ensure the chose values are within an acceptable format, within an acceptable range, etc. FIG. 5 illustrates a flow diagram of one embodiment of a process for validating received meta information for a complex metadata driven database query. The process is performed by processing logic that may comprise hardware (circuitry, dedicated logic, etc.), software (such as is run on a general purpose computer system or a dedicated machine), or a combination of both.

Referring to FIG. 5, in one embodiment, the process begins when processing logic receives a metadata selection where the metadata selection corresponds to a complex database query (processing block 502). As discussed above, the query is a complex database query which may consist of one or more conditions. As such, the complex database query may be a multi-table multi-database query. Processing logic then validates the received information (processing block 504). In one embodiment, a JavaScript string included with the SQL snippets for the selection includes a parameterized function call. For example, if a zip code represents a value in a condition which is part of a complex database query, the entry of a zip code would trigger the evaluation of the parameterized function call by an onboard event handler of a user interface. Therefore, the zip code text would be the input value for the parameterized function to verify that the entered text complies with a desired zip code, a desired zip code range, etc. In one embodiment, in response to the parameterized function encountering an invalid value, processing logic could cause the display of a dialog box, popup message, etc. which explains that an error has occurred, why the error has occurred, and/or what the valid ranges are for the value which caused the error. One skilled in the art will recognize the various method of validating user-inputted data.

Processing logic then stores identification numbers for each condition, and/or complex database query in a database (processing block 506). In one embodiment, each condition is stored as a record in a database table. Accompanying each record in the table is:

The groupID,
The groupName,
An optional longer user-provided groupDescription,
An enumerator for groupType (contact, page or activity)
A conjunctionOperator (either AND or OR which will apply to all its conditions)

A recordMemberShipChanges Boolean. The Boolean default value is false. However, if value changes to true, a true Boolean value will generate a contactEvent record every time a new contact joins this group or an existing one leaves.

A lastModified timestamp which is automatically updated each time the record receives any update.

In one embodiment, as discussed above, a programmatic condition, or complex database query, can have one or more conditions. The conditions are stored in a separate database table. Furthermore, in one embodiment, each condition has a unique ID, but also a group ID which allows two or more conditions to belong to a particular group. In one embodiment, each database record in the database table for conditions will also include:

A unique groupConditionID
A groupID
A fieldMetaInfoID which defines what field type this condition has
A operatorID which defines the chosen operator from the valid ones given by the operatorGroup for the above field type
A value, simply a string even if was a numeric or enum or ID value.

In one embodiment, the complex database query, e.g., the one or more conditions that embody the complex databaseq query, is constructed from the meta data stored in the group record, and the various condition records for that group. In one embodiment, the query is constructed in PHP. However, other programming languages could be used to construct the query.

As discussed above, complex database queries are database queries evaluated against a database that contains clickflow data. The clickflow data may, in one embodiment, include one or more of contact information (e.g., persons of interest being tracked), page information (e.g., data corresponding to a web page being tracked), activity information (e.g., categories of activities being tracked, such as a specific marketing campaign, a specific solicitation campaign, specific ad campaigns, what ads generate the most number of hits, most successful activities etc.), etc. Therefore, in one embodiment, the database query for a group represented by a programmatic condition, which returns all the contacts, pages, and/or activities which satisfy the group's conditions, has the structure:

```
SELECT      <fields> FROM <tables>
WHERE
            <selectCustomerCondition>
AND (
            <condition1>
AND/OR      <condition2>
AND/OR      <condition3>
etc.
)
ORDER BY <sortByColumn> [DESC]
LIMIT <startingAtItem>,<itemsPerPage>
```

In one embodiment, '<fields>' is one of a contact.contactID, an activity.activityID, a collection of contact fields, etc. Clients (UI PHP pages) are able to decide the field based on stored PHP session state information. <tables>, in one embodiment, would therefore the union of all the tables required by any rule. That is, for example, if a complex database query included a query across Table 1 and Table 2, <tables> would be (Table 1 Å Table 2), e.g., a large table representing the joined/unioned tables Table 1 and Table 2. Because the tables are joined, individual conditions state what tables the condition searches on, and a routine to concatenate the tables and provide each with a unique identifier.

In one embodiment, the AND or OR conjunction operator is global for each complex database query.

In one embodiment, <selectCustomerCondition> distinguishes between specific customers, e.g., the customerIDs, because contacts of all customers are intermingled in a database. In order to prevent a customer from viewing irrelevant data, only those contacts associated with the customerId are applied to conditions satisfying <selectCustomerCondition>. In one embodiment, for a contacts group, this will be "contact.customerID=custID" where custID represents a currently logged in customer's ID, which is stored in the PHP's session state information. For activities, it would be "activity.customerID=custID."

In one embodiment, <conditionN> is verbatim SQL code, constructed from the code snippets stored in the SQLcondition field of the condition. In one embodiment, popup or user interface display settings may be included in the general structure noted above, including <sortByColumn>, <startingAtItem>, <ItemsPerPage>, display descending <DESC>, display ascending <ASCEN>, etc. One skilled in the art will recognize the various options for generating a display of a list of elements.

In one embodiment, the whole query is constructed from PHP after the sub-construction of each <conditionN>, from the general query structure. Each <conditionN> is itself constructed from SQL snippets, as discussed below.

In order to construct a simple condition, for example the condition "Last Name is Mohos," a value for that condition is stored in a database (e.g., value in this example is Mohos). In this example, the value is a string, but often the values will be static or computed enumerators which serve as metadata identification numbers for the specific condition value. Furthermore, because values are stored in the database without quotation marks, in order to preserve proper query syntax, quotation marks are added when the condition is constructed. Thus the final condition would be:
    contact.lastName="value"
However, to actually create the condition string, which in one embodiment is an SQL condition string, a concatenation of field, operator and value dependent SQL is utilized. In one embodiment, the_value_in a canned SQL snippet is replaced with the actual value of the query as stored in the condition.

Then, the actual value is appended to the field dependent SQL snippet. In one embodiment, '_value_' is used rather than 'value' to ensure that the actual value does not replace a table's field called value. As such, the concatenation of SQL to construct the condition would be:

```
fieldSnippet:
contact.lastName
operatorSnippet (string equals operator)
= "_value_"
value (always stored as string)
Mohos
operatorSnippet.replace( "_value_", value )
= "Mohos"
fieldSnippet.concat( . )
contact.lastName = "Mohos"
```

Note that a trivial fieldSnippet.concat(concat(operatorSnippet, value)) is not used because SQL syntax may or may not require the value to be enclosed in quotation marks. Furthermore, in some circumstances, more complex operations are performed on a value, as discussed below.

When the condition is somewhat more complex, the purpose for storing values in the database without quotation marks is exemplified. For example, the condition "Company contains Ford" uses a "LIKE" operator. However, simply inserting a quoted value would not satisfy SQL required syntax form. Thus, by inserting the unquoted value Ford into the condition, the final condition for the operator "LIKE" would be:
    contact.company LIKE "%value%"
In this example, the concatenation of SQL to construct the condition would be:

```
fieldSnippet:
contact.Company
operatorSnippet (string equals operator)
LIKE "%_value_%"
value (always stored as string)
Ford
operatorSnippet.replace( "_value_", value )
LIKE "%Ford%"
fieldSnippet.concat( . )
contact.firstName LIKE "%Ford%"
```

Furthermore, some conditions require that the specific value not be quoted in the final condition. For example, the condition "Number of visits>6" requires no quotation marks around the value (e.g., 6):
    contact.numberVisits>value
More complex conditions, follow similar guidelines to those discussed above for simple conditions. For example, consider a condition indicating that a specific contact's "tag is Hot." The label "Hot" is a user-definable label which may indicate, for example, contacts that are likely to purchase a product in a specified quarter. In one embodiment, other typical labels might distinguish between contacts. For example, contacts may be labeled as "A Leads" signifying high likelihood of sale for the contact(s), "B Leads" slightly less likelihood of sale for the contact(s), and "C Leads" signifying all other contacts. In one embodiment, other labels may be applied to contacts signifying the contact originated from various sources (e.g., "Salesforce", "Comdex" etc.) Because the condition is a contact based condition, the condition is applied to a specific customer's contacts. As a result, a customer ID for the currently logged in customer is obtained from login information, as noted above. To further complicate the condition, three databases tables are needed to satisfy a search based on the condition, a contacts table, a tag table, and a contact_has_tag table. E.g., for a customer, only the customer's contacts will be searched using the condition. From those contacts, only contacts that have the specific tag are relevant to the search. Then finally, from the contacts with the tag, the condition is used to determine which tag values are "Hot." The final form of this condition, constructed using a PHP script, would resemble:

```
SELECT contact.firstName, contact.lastName
FROM tag, contact, contact_has_tag
WHERE tag.customerID = __custID__
AND contact.contactID = contact_has_tag.contactID
AND contact_has_tag.tagID = tag.tagID
AND tag.tagNAME = "__value__"
```

The conditions described above are merely exemplary conditions that may be constructed according to embodiments of the present invention. One skilled in the art will recognize the various types of conditions that could be constructed to search clickflow data gathered and stored in a clickflow tracking database. In one embodiment, the conditions are constructed and evaluated on the fly from metadata representing the field, operator, and values for a specific condition. In another embodiment, a constructed complex query statement could be stored as a statement in the corresponding database record itself. In yet another embodiment, a truncated version of the completely constructed database query could be stored as a record so that other functions could utilize the constructed database query with slight adaptations.

Figure 6:
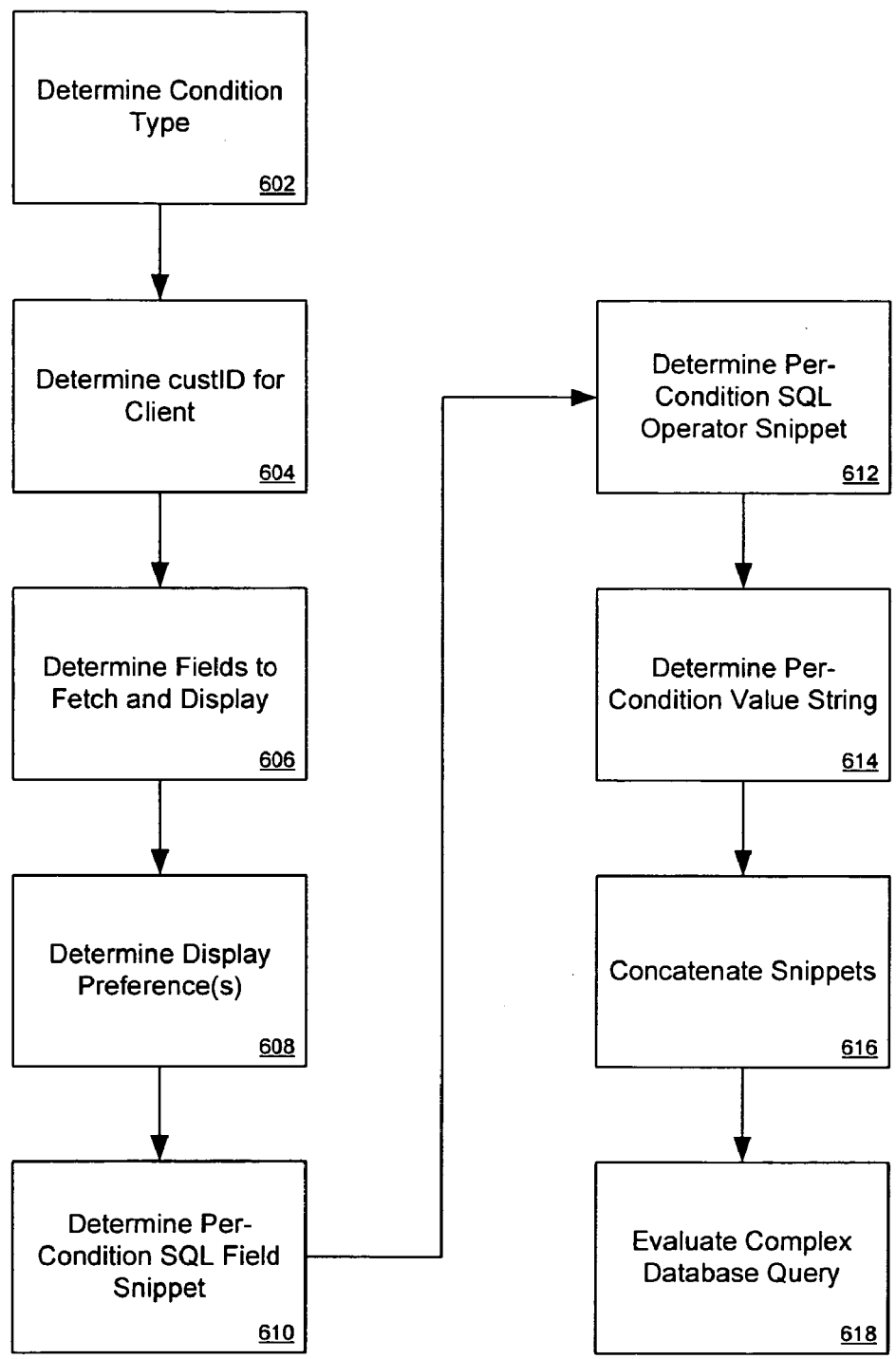
FIG. 6 illustrates a flow diagram of one embodiment of a process for evaluating a complex database query database query including one or more conditions.

FIG. 6 illustrates a flow diagram of one embodiment of a process for evaluating a complex database query including one or more conditions. The process is performed by processing logic that may comprise hardware (circuitry, dedicated logic, etc.), software (such as is run on a general purpose computer system or a dedicated machine), or a combination of both.

Referring to FIG. 6, the process begins with processing logic determining a condition type for the current condition to be constructed (processing block 602). In one embodiment, the condition is one of a contact, a web page, or an activities condition. However, other conditions may easily be implemented. In one embodiment, data indicating condition type is indicated in <selectCustomerCondition>, as discussed above. Processing logic then determines a customer ID, e.g., custID, for a web client which is currently on-line and seeking to construct a complex database query consisting of one or more conditions. As discussed above, a customer ID is included in <selectCustomerCondition> data to distinguish between different customer and the conditions constructed by those customers.

Because a condition applies to a specific field, the field associated with the condition is also determined from the <selectCustomerCondition> data (processing block 606). In one embodiment, as discussed above, a field, operator, and value for a condition are defined as being associated with one another. Thus, processing logic can display the elements of the condition in a user interface.

In one embodiment, processing logic determines display preferences associated with a customer ID (processing block 608). The display preferences may be a default preference or a user-defined preference which is stored in a database and associated with a particular customer ID. In one embodiment, the display preference include one or more of how many entries per-page to display, what page should be shown, whether to sort results in an ascending or descending order, etc.

Next, processing logic constructs, for each condition of a complex database query, an SQL field snippet for the field, associated operator, and associated value string (processing block 610). In one embodiment, the snippets are constructed by replacing a canned, or generic, values with the actual values of the current condition (processing blocks 610-614).

In one embodiment, after the actual condition values for the snippets are added to the generic snippets, processing logic concatenates the snippets to form a complex database query string (processing block 616). Since the resultant string of the concatenation is a complete database query string, such as an SQL query string, processing logic then evaluates the automatically generated complex database query (processing block 618).

In one embodiment, the complex database query is constructed and evaluated upon receiving an indication form a user to evaluate the complex database query. In another embodiment, metadata representing the complex database query is utilized by a tracking system to periodically construct and execute a resultant complex database queries.

Figure 7:
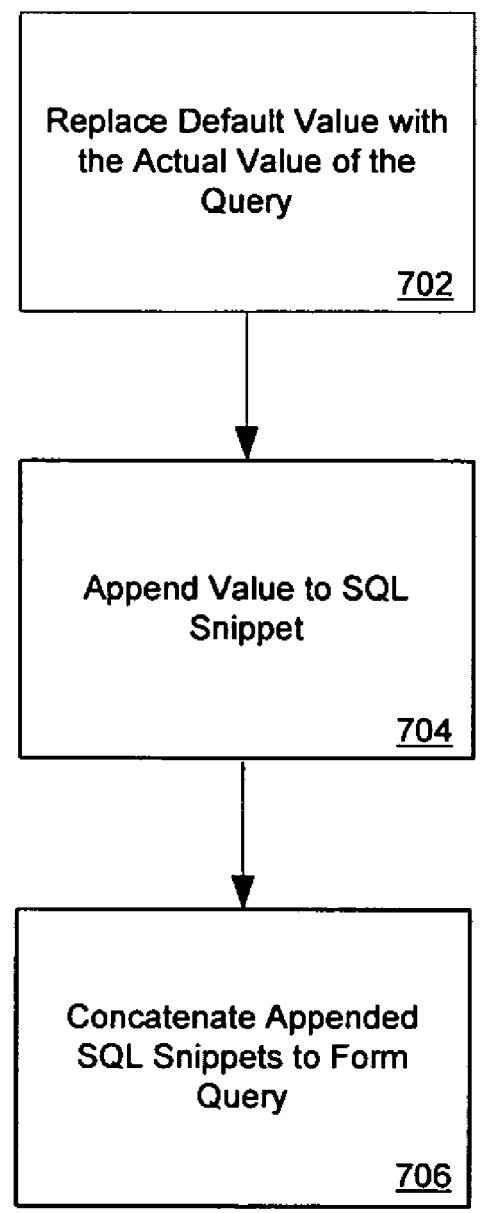
FIG. 7 illustrates a flow diagram of one embodiment of a process for constructing a complex database query condition.

FIG. 7 illustrates a flow diagram of one embodiment of a process for constructing a condition. The process is performed by processing logic that may comprise hardware (circuitry, dedicated logic, etc.), software (such as is run on a general purpose computer system or a dedicated machine), or a combination of both.

Referring to FIG. 7, the process begins when processing logic replaces default values, or canned values, of a condition query with the actual value of the query (processing block 702). In one embodiment, the condition query is an SQL condition query. Furthermore, in one embodiment, the values are metadata representing user-selected values received from a user interface for constructing conditions. In this embodiment, processing logic would correlate the metadata with the actual value to be queried. Next processing logic appends the actual query value to an SQL snippet corresponding to the current query (processing block 704). In one embodiment, the appended SQL snippets are then concatenated to form a condition query (processing block 706).

Figure 8:
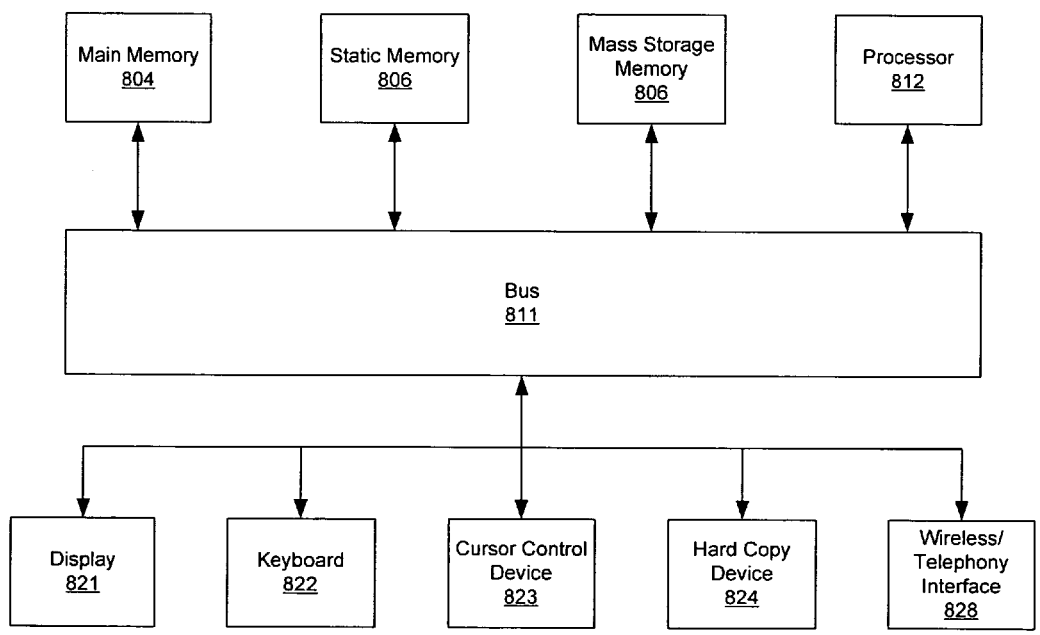
FIG. 8 is a block diagram of an exemplary computer system.

FIG. 8 is a block diagram of an exemplary computer system that may perform one or more of the operations described herein. Referring to FIG. 8, computer system 800 may comprise an exemplary client or server computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for marking information on a medium such as paper, film, or similar types of media. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer implemented method, comprising:
   receiving, by a processor, a selection of meta data from a client system indicative of searchable data values stored in two or more database tables, wherein a first database table stores search groups and a second database table stores search conditions for each group;
   constructing, by the processor, a complex database query, by concatenating structured query language (SQL) snippets together to form the complex database query, to search the two or more database tables based on the received selection of meta data;
   identifying, by the processor, each condition of the complex database query with a unique condition identifier and a unique group identifier for a group to which the condition is a member;
   storing, by the processor, query meta data with the unique condition identifier and the unique group identifier that represents the complex database query;
   in response to a determination that one or more data items obtained from evaluation of the complex database query are being displayed by the client system, reconstructing, by the processor, the complex database query from the stored query meta data at periodic intervals to update the one or more database items independent of client system requests to update the one or more data items;
   writing the complex database query to a tracking server, the tracking server to provide modified links to the client system for entry to a website, the modified links in a format that resembles a website address for the website served from a web server, but to resolve at the tracking server through which client system interactions with the website can be tracked;
   for each periodic interval, the tracking server evaluating the complex database query against a tracking database coupled with the tracking server, the tracking database to store user clickflow data for client system selections of the modified links monitored and updated by the tracking server in real time; and
   sending a result of the evaluation to the client system to update the display of the one or more data items to provide real time updates for results of the evaluated complex database query to a user without receiving a query request from the user.

2. The computer implemented method of claim 1, further comprising:
   receiving resultant meta information, in response to evaluating the complex database query, corresponding to the constructed complex database query; and
   dynamically generating a graphical user interface based on the received resultant meta information.

3. The computer implemented method of claim 1, wherein the complex query is a complex multi-table and multi-database query.

4. The computer implemented method of claim 1, wherein the meta data is a condition defined by a field, an operator, and a value.

5. The computer implemented method of claim 1, wherein the query is a compound query comprising a plurality of conditions.

6. The computer implemented method of claim 1, further comprising:
   validating the selection of metadata, prior to constructing the complex database query, when the received selection includes user-inputted data.

7. The computer implemented method of claim 6, further comprising:
   notifying a user when the selection of metadata includes invalid meta data.

8. The computer implemented method of claim 1, further comprising:
   obtaining metadata indicative of all searchable data values associated with an identification of a user using a user interface;
   dynamically constructing a user interface, prior to the receiving, to present the metadata indicative of all searchable data values.

9. The computer implemented method of claim 1, wherein the constructing is performed by a Hypertext Preprocessor (PHP) script.

10. The computer implemented method of claim 1, further comprising:
    joining the two or more database tables into a single searchable database table.

11. The computer implemented method of claim 1, wherein the searchable data is clickflow data indicative of a user's interactions with a web page.

12. The computer implemented method of claim 1, further comprising:
    adding new searchable data values to the two or more database tables; and
    updating metadata definitions for the new searchable data values.

13. A computer readable storage medium that provides instructions, which when executed by a processing system, causes said processing system to perform a method comprising:
    receiving a selection of meta data from a client system indicative of searchable data values stored in two or more database tables, wherein a first database table stores search groups and a second database table stores search conditions for each group;

constructing a complex database query, by concatenating structured query language (SQL) snippets together to form the complex database query, to search the two or more database tables based on the received selection of meta data;

identifying each condition of the complex database query with a unique condition identifier and a unique group identifier for a group to which the condition is a member;

storing query meta data with the unique condition identifier and the unique group identifier that represents the complex database query;

in response to a determination that one or more data items obtained from evaluation of the complex database query are being displayed by the client system, reconstructing the complex database query from the stored query meta data at periodic intervals to update the one or more database items independent of client system requests to update the one or more data items;

writing the complex database query to a tracking server, the tracking server to provide modified links to the client system for entry to a website, the modified links in a format that resembles a website address for the website served from a web server, but to resolve at the tracking server through which client system interactions with the website can be tracked;

for each periodic interval, the tracking server evaluating the complex database query against a tracking database coupled with the tracking server, the tracking database to store user clickflow data for client system selections of the modified links monitored and updated by the tracking server in real time; and sending a result of the evaluation to the client system to update the display of the one or more data items to provide real time updates for results of the evaluated complex database query to a user without receiving a query request from the user.

14. The computer readable medium of claim 13, further comprising:

receiving resultant meta information, in response to evaluating the complex database query, corresponding to the constructed complex database query; and dynamically generating a graphical user interface based on the received resultant meta information.

15. The computer readable medium of claim 13, wherein the complex query is a complex multi-table and multi-database query.

16. The computer readable medium of claim 13, wherein the meta data is a condition defined by a field, an operator, and a value.

17. The computer readable medium of claim 13, wherein the query is a compound query comprising a plurality of conditions.

18. The computer readable medium of claim 13, further comprising:

validating the selection of metadata, prior to constructing the complex database query, when the received selection includes user-inputted data.

19. The computer readable medium of claim 18, further comprising:

notifying a user when the selection of metadata includes invalid meta data.

20. The computer readable medium of claim 13, further comprising:

obtaining metadata indicative of all searchable data values associated with an identification of a user using a user interface;

dynamically constructing a user interface, prior to the receiving, to present the metadata indicative of all searchable data values.

21. The computer readable medium of claim 13, wherein the constructing is performed by a Hypertext Preprocessor (PHP) script.

22. The computer readable medium of claim 13, further comprising:

joining the two or more database tables into a single searchable database table.

23. The computer readable medium of claim 13, wherein the searchable data is clickflow data indicative of a user's interactions with a web page.

24. The computer readable medium of claim 13, further comprising:

adding new searchable data values to the two or more database tables; and updating metadata definitions for the new searchable data values.

25. A system, comprising:

a database stored in a computer memory; and a client, wherein the client is to:

receive a selection of meta data from a client system indicative of searchable data values stored in two or more database tables of the database stored in the computer memory, wherein a first database table stores search groups and a second database table stores search conditions for each group;

construct a complex database query, by concatenating structured query language (SQL) snippets together to form the complex database query, to search the two or more database tables based on the received selection of meta data;

identify each condition of the complex database query with a unique condition identifier and a unique group identifier for a group to which the condition is a member;

store query meta data with the unique condition identifier and the unique group identifier that represents the complex database query;

in response to a determination that one or more data items obtained from evaluation of the complex database query are being displayed by the client system, reconstruct the complex database query from the stored query meta data at periodic intervals to update the one or more database items independent of client system requests to update the one or more data items;

write the complex database query to a tracking server, the tracking server to provide modified links to the client system for entry to a website, the modified links in a format that resembles a website address for the website served from a web server, but to resolve at the tracking server through which client system interactions with the website can be tracked;

for each periodic interval, the tracking server to evaluate the complex database query against a tracking database coupled with the tracking server, the tracking database to store user clickflow data for client system selections of the modified links monitored and updated by the tracking server in real time; and send a result of the evaluation to the client system to update the display of the one or more data items to provide real time updates for results of the evaluated complex database query to a user without receiving a query request from the user.

26. The system of claim 25, further comprising:
the client to:
receive resultant meta information, in response to the request, corresponding to the complex database query; and
dynamically generate a graphical user interface based on the received resultant meta information.

27. The system of claim 25, wherein the complex query is a complex multi-table and multi-database query.

28. The system of claim 25, wherein the meta data is a condition defined by a field, an operator, and a value.

29. The system of claim 25, wherein the query is a compound query comprising a plurality of conditions.

30. The system of claim 25, further comprising:
the client to:
validate the selection of metadata, prior to construction of the complex database query, when the received selection includes user-inputted data.

31. The system of claim 30, further comprising:
the client to:
notify a user when the selection of metadata includes invalid meta data.

32. The system of claim 25, further comprising:
the client to:
obtain metadata indicative of all searchable data values associated with an identification of a user using a user interface;
dynamically construct a user interface to present the metadata indicative of all searchable data values before the selection of meta data is received.

33. The system of claim 25, wherein the construction is performed by a Hypertext Preprocessor (PHP) script.

34. The system of claim 25, further comprising:
the client to:
join the two or more database tables into a single searchable database table.

35. The system of claim 25, wherein the searchable data is clickflow data indicative of a user's interactions with a web page.

36. The system of claim 25, further comprising:
the client to:
adding new searchable data values to the two or more database tables; and
updating metadata definitions for the new searchable data values.

37. The computer implemented method of claim 1, further comprising:
constructing multiple conditions for the reconstructed complex database query, wherein each condition is constructed by,
replacing a default value of a condition query with a meta data value for the complex database query, wherein the meta data value is obtained from the query meta data,
correlating the meta data value with an actual value to be queried, and
appending the actual value to be queried to an SQL snippet that corresponds to the current query; and
concatenating the constructed SQL snippets together to form the reconstructed complex database query.

* * * * *